UNITED STATES PATENT OFFICE.

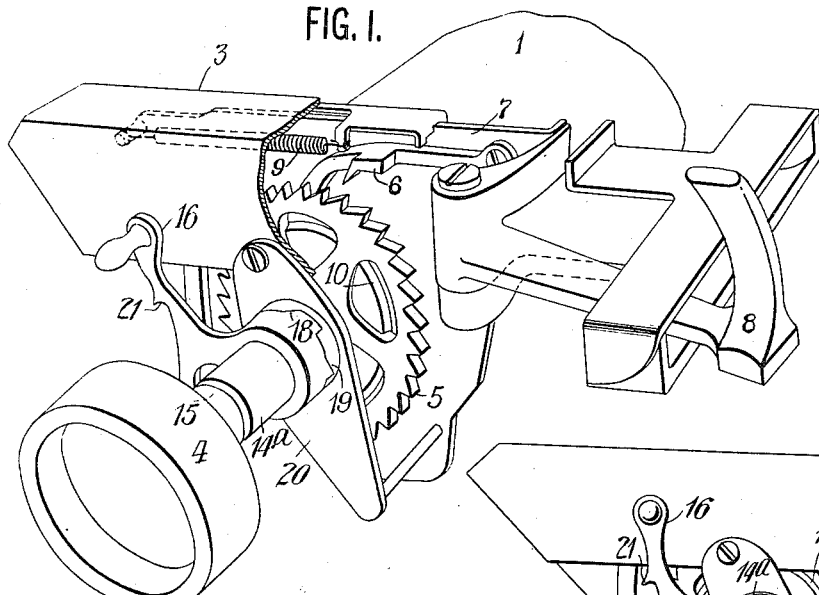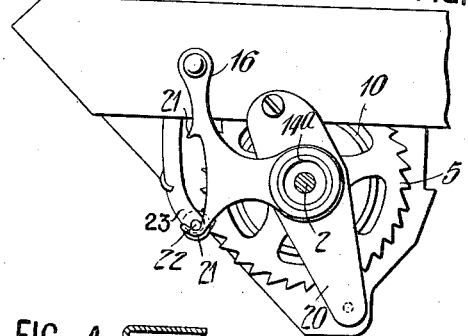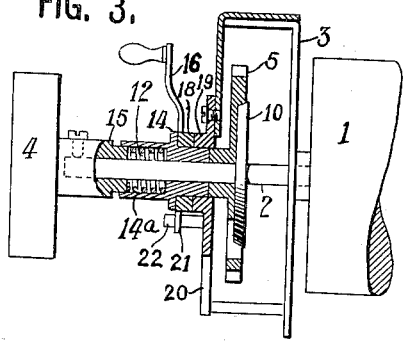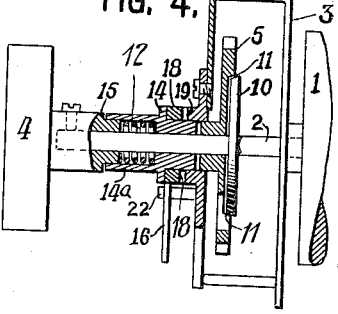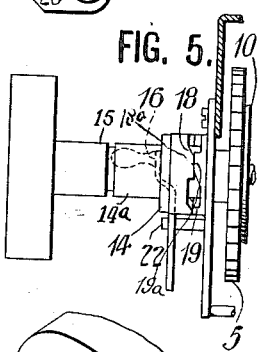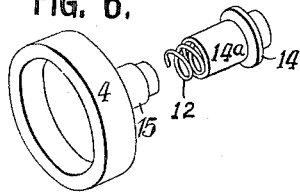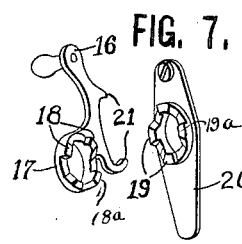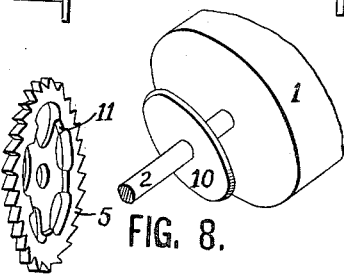

ADOLPHUS S. DENNIS, OF LAKEWOOD, OHIO, ASSIGNOR TO UNDERWOOD TYPEWRITER COMPANY, OF NEW YORK, N. Y., A CORPORATION OF DELAWARE.

TYPE-WRITING MACHINE.

1,226,643.

Specification of Letters Patent.

Patented May 22, 1917.

Application filed April 19, 1913. Serial No. 762,180.

*To all whom it may concern:*

Be it known that I, ADOLPHUS S. DENNIS, a citizen of the United States, residing in Lakewood, in the county of Cuyahoga and State of Ohio, have invented certain new and useful Improvements in Type-Writing Machines, of which the following is a specification.

This invention relates to means for releasably connecting the line-space wheel to the platen.

An object of this invention is to produce a simple but efficient clutching mechanism.

A further object is to provide a device that may be easily attached with a minimum amount of changes to existing machines.

The invention further provides improved means to prevent the platen from turning too freely while the line-space wheel is unclutched therefrom, thereby facilitating accurate and fine adjustments of the platen, and preventing accidental displacement of the platen from its adjusted position.

The line-space wheel is mounted for both rotation and longitudinal movement on the platen axle and is formed with a clutch face movable into and out of frictional engagement with a clutch disk fixed to the platen axle, to connect and disconnect the platen to and from the line-space wheel. A spring-pressed sleeve on the axle bears against the line-space wheel and normally holds the latter against the clutch disk. The sleeve may be retracted to release the wheel by means of a lever having a hub journaled on the sleeve between a collar or shoulder on the sleeve and a cam on the platen frame coöperating with a cam on said hub, so that when the lever is rocked, the cams retract the sleeve and release the wheel. The spring by which the sleeve is caused to bear against the line-space wheel, may re-act between the sleeve and the platen, or a part connected to the platen, (when the line-space wheel is released), to apply an endwise pressure to the platen. The friction thus produced between the platen and its bearings prevents the platen from turning too freely, and thereby aids in accurate and fine adjustments of the platen, and prevents the platen from being thrown out of adjustment by the operation of the clutch.

Other features and advantages will hereinafter appear.

In the accompanying drawings,

Figure 1 shows the invention applied to the well-known Underwood typewriter carriage which is only partly shown.

Fig. 2 is an end view of Fig. 1, with the hand wheel removed, to more clearly show the clutch-controlling lever and its limiting stops.

Fig. 3 is a sectional view showing the parts in an operative or clutching position.

Fig. 4 is a sectional view showing the parts in an inoperative or released position.

Fig. 5 shows the position of the clutch-controlling lever cams when the clutch is released, as shown in Fig. 4.

Figs. 6, 7 and 8 are detail perspectives of the various parts comprising the clutch mechanism.

The platen 1 is fixed upon an axle 2 journaled in the ends of the platen frame 3, and may be rotated by means of a hand wheel 4 or a line-space ratchet wheel 5. The wheel 5 is driven by a pawl 6 pivoted upon a sliding bar 7 operated by a bell crank 8, and the slide bar is returned to normal position by a spring 9. The line-space wheel 5 is mounted loosely upon the platen axle 2 and is connected to the platen by means of a clutch comprising a bevel edged disk 10 fast on platen axle 2 and seated in a bevel edged depression 11 cut in the inner face of the line-space wheel so that when the line-space wheel is forced upon the disk 10, they will become frictionally connected. The ratchet wheel 5 is movable axially so that it may be forced upon the disk 10. The clutch is normally kept closed by means of a spring 12 forcing a sleeve 14$^a$ loose on the shaft 2 against the hub of the line-space wheel. The spring 12 may be confined in a housing formed in the sleeve 14$^a$, the internal diameter of the sleeve being enlarged for a portion of its length to accommodate the spring and to telescope over the reduced end of the hub 15 of hand wheel 4.

The platen 1 is releasable from the line-space wheel 5 by a lever 16 fastened to or formed integral with a hub 17 having a series of cams or inclined surfaces 18 to coöperate with a like series of cam surfaces 19 on a plate or support 20 fixed to the platen frame 3. The hub 17 is confined between the plate 20 and a collar 14 on the sleeve 14$^a$ so that when the lever 16 is rocked down, the cams 18, 19 cam the sleeve 14ª to the left and release the clutch. The platen can now rotate independently of the wheel, and may be adjusted to any desired position while the wheel is held stationary by the usual holding detent 23. The lever is then returned and permits the clutch to again lock the platen to the wheel.

When the lever 16 is in position to release the clutch, the spring 12 is under compression between the sleeve 14ª and the inner end of the hub 15, whereby an endwise pressure is applied to the platen. As a powerful spring 12 is employed to make the clutch effective, the pressure applied by the spring to the platen, when the clutch is released, produces sufficient friction between the platen frame and the platen to prevent the platen from turning too freely. An accurate and fine rotary adjustment of the platen is thus facilitated, and the platen held against accidental displacement from its adjusted position, either before the lever 16 is operated to connect the clutch parts, or during such operation.

Dwell portions 18ª, 19ª respectively are provided for the cam surfaces 18, 19, said dwell surfaces becoming opposed when the clutch is released to retain it in that condition until the lever 16 is swung back for reengagement of the platen and line-space wheel.

The operating lever 16 is limited in its movements by stops 21 formed on the body of said lever, striking a pin 22 on the detent 23.

Variations may be resorted to within the scope of the invention, and portions of the improvements may be used without others.

Having thus described my invention, I claim:

1. In a typewriting machine, the combination of a platen frame, a platen axle, a platen fixed upon said axle, a bevel edged disk carried by the axle, a line-space wheel loose upon said axle and having a bevel edged depression in its side, a spring to move said line-space wheel axially onto said disk to lock the line-space wheel and platen together, a lever swinging transversely to the movement of the carriage, a series of cams on said lever, a second series of cams, and a support for said last-named cams, the two series of cams coöperating to control the action of said spring to lock or unlock said line-space wheel to or from said platen.

2. In a typewriting machine, the combination of a platen frame, a platen axle, a platen fixed upon said axle, a bevel edged disk carried by the axle, a line-space wheel loose upon said axle and having a bevel edged depression in its side, a spring to move said line-space wheel axially onto said disk to lock the line-space wheel and platen together, a lever swinging transversely to the movement of the carriage, a series of cams on said lever, a second series of cams, a support for said last-named cams, the two series of cams coöperating to control the action of said spring to lock or unlock said line-space wheel to or from said platen, and stops to limit the movement of said controlling lever.

3. In a typewriter, the combination of a platen frame, a platen axle, a platen fixed upon said axle, a line-space wheel loose upon said axle, a clutch between said line-space wheel and platen, a lever having a hub mounted upon the platen axle and formed with a cam on the hub, a cam on the platen frame coöperating with the cam on the lever to thrust said lever endwise along the platen axle, and means operated by said movement of the lever along the axle to release the clutch.

4. The combination of a platen frame, of a rotatable platen supported thereby, a line feeding device for rotating said platen, releasable connecting means between said platen and said feeding device, a rotatable lever and a member mounted on the platen frame coöperating with said lever and causing said lever, by the rotation thereof with respect to the platen, to move longitudinally of the platen for disconnecting said platen from the line feeding device.

5. The combination with a platen frame, a platen axle journaled therein and a platen fixed to the axle, of a line-space wheel loose on the axle, a clutch device to connect the line-space wheel with the axle, a sleeve mounted on the axle and slidable longitudinally thereof to effect a clutching engagement between said wheel and clutch device, a spring to operate said sleeve in one direction, a lever mounted on said sleeve and bearing against a collar formed on said sleeve, and a cam between said lever and the platen frame for retracting said sleeve and compressing the spring when the lever is rotated.

6. The combination with a platen frame, a platen axle journaled therein and a platen fixed to said axle, of a line-space wheel loose on the axle, clutch mechanism for connecting the line-space wheel to rotate with the axle, a lever mounted for rotation on the platen axle, a cam on said lever, a coöperating cam on the frame whereby the lever is moved longitudinally of the axle when rotated, and a connection between said lever and clutch device for operating the latter through said longitudinal movement of the lever.

7. The combination with a rotatable platen and a platen axle, of a line-space wheel rotatable on the axle, a hand wheel secured to the axle, a sleeve slidably mounted on the axle and having its internal diameter enlarged at the end and telescoping with the hub of the hand wheel, a coil spring housed 13ᴄ in said enlarged portion of the sleeve and bearing against said hub and sleeve, means operated by said sleeve for connecting the line-space wheel to rotate with the platen axle, a lever, and a cam operated thereby for moving said sleeve toward the hand wheel.

8. The combination with a platen frame and a revoluble platen supported thereby, of a clutch member in fixed relation to said platen, an independently revoluble line-space wheel axially movable into clutching engagement with said clutch member, spring means to press said line-space wheel into clutching position, a lever so supported that it normally remains at rest while the platen rotates, said lever being rotatable about the platen axis and movable during said rotation, through a limited range in a plane transverse to the platen, and means operated by said lever during said movement to free the line-space wheel from the clutch member.

9. The combination with a platen frame and a platen revolubly supported thereby, of an independently revoluble line-space wheel, clutch mechanism for connecting the line-space wheel to revolve with the platen, a lever so supported that it normally remains at rest while the platen rotates, said lever capable of axial movement and of swinging transversely of the platen, a cam on said lever, a coöperating cam on the frame whereby the lever moves axially when swung transversely, and a connection between said lever and clutch mechanism for operating the latter through the axial movement of the lever.

10. In a typewriting machine, the combination of a platen frame, a platen, a platen axle, a friction clutch disk fixed on the axle, a line-space wheel rotatable on the axle and having a clutch face to coöperate with said disk, said wheel being movable longitudinally of the axle into and out of clutching engagement with the disk, a lever normally at rest while the platen rotates, and a cam carried with the lever and operable to cam the lever in a direction longitudinally of the platen axis as the lever is rotated, the lever being operable by its movement longitudinally of the platen axis to control said movement of the line-space wheel longitudinally of the axle.

11. The combination with a platen frame having a platen axle and a platen connected thereto, of a clutch member fixed to the axle, a line-space wheel rotatable on the axle and movable longitudinally of the axle into clutching engagement with said clutch member, spring means to move said wheel into clutching position, a lever rotatable about an axis extending in the direction of the platen axis, means to move the lever in the direction of its axis as it rotates, and means operated by the lever to free the line-space wheel from the clutch member.

12. The combination with a platen frame having a rotatable platen and its axle, of a clutch disk fixed to the axle, a line-space wheel movable into and out of clutching engagement with said disk and rotatable on the axle, a sleeve on the axle and movable longitudinally thereof to force the line-space wheel against said clutch disk, and a device comprising a cam, normally at rest during the rotation of the platen, said device operable to revolve the cam about the platen axis and cause it to directly engage and move said sleeve along the axle.

13. The combination with a rotatable platen, a line feeding device for rotating said platen, releasable connecting means between said platen and said line feeding device, an operating device for said connecting means comprising a lever rotatable about the platen axis and movable by its rotation longitudinally thereof, a cam carried by said lever and a spring mounted outside the platen frame and acting through the medium of said cam to hold said lever against rotational and longitudinal movement.

14. In a typewriting machine, the combination with a platen frame, of a revoluble platen supported thereby, a friction clutch disk in fixed relation to said platen, an independently revoluble line-space wheel having a clutch surface to coöperate with said disk and axially movable into and out of clutch engagement with said disk, means including a lever movable axially to control the axial movement of the line-space wheel, a part coacting with said lever, and a cam carried by said lever and interposed between the platen frame and said part to effect said axial movement of said lever.

15. The combination with a platen frame and a revoluble platen supported thereby, of a clutch member in fixed relation to said platen, an independently revoluble line-space wheel movable axially into and out of clutching engagement with said clutch member, spring means to move said line-space wheel into clutching position, and means comprising a cam rotatable about the platen axis, and so supported that the platen normally rotates independently thereof, said cam being positioned between the platen frame and said spring means, and operable through a limited range to shift said means and thereby permit the line-space wheel to move axially and release said clutch engagement, permitting the platen to rotate independently of the line-space wheel.

16. The combination with a platen frame and a rotatable platen, of a line feeding device for rotating said platen, releasable connecting means between said platen and said line feeding device, an operating device for said connecting means, a cam rotated by said operating device to control said releasable connecting means on movement of said operating device, and a spring mounted outside the platen frame acting through said cam to hold said operating device in normal position by reason of the camming action, said cam acting against said spring on rotation of said cam to hold said lever in its operated position, said spring when so acted on by said cam also acting to apply an increased pressure to said platen, preventing its too free rotation when disconnected from the line feeding device.

17. The combination with a platen frame, a rotatable platen and a line feeding device for rotating said platen, of releasable connecting means between the platen and said line feeding device, an operating device for said connecting means, said operating device being mounted for rotation on the platen axis and acting when rotated to control said releasable connecting means, a cam on said operating device, a second cam with which said first cam coöperates, said cams having coöperating dwell portions and a spring mounted outside the platen frame acting through the medium of said dwell portions to hold said operating means in its operated position when rotated to control said connecting means, said spring also acting through the medium of said cams to apply an increased pressure to said platen, preventing it from too free rotation when disconnected from the line feeding device.

18. In a typewriting machine, the combination of a platen frame, a platen, a platen axle, a friction clutch-disk fixed on the axle, a line-space wheel rotatable on the axle and having a clutch face to coöperate with said disk, said wheel movable longitudinally of the axle into and out of clutching engagement with the disk, a spring to hold said wheel and disk in frictional engagement, means to relieve the wheel of the pressure of the spring to release said wheel from the disk, and means to transmit pressure of the spring to the platen independently of said wheel and thereby frictionally hold the platen against too free a rotation.

19. In a typewriting machine, the combination of a platen frame, a platen axle, a platen fixed on said axle, a line-space wheel loose on the axle, means forming with said wheel a clutch to releasably connect the wheel and platen, said wheel movable longitudinally of the platen into and out of clutching position, a spring to move said wheel into clutching position, and means to move said wheel out of clutching position, and to cause the spring to react between the platen frame and the platen in a direction to apply an endwise pressure to the platen and frictionally hold the platen against too free a rotation in its bearings, and thereby facilitate rotative adjustment of the platen relative to the line-space wheel while disconnected from said wheel.

20. The combination with a rotary platen and a platen axle, of a line-space wheel loosely mounted on the axle, a clutch part fixed to said axle, said line-space wheel movable longitudinally of the axle into and out of frictional holding engagement with said clutch part, a spring reacting between said wheel and the platen for frictionally holding said wheel and said clutch part together, to cause the platen and wheel to rotate together, and means to relieve the wheel of the pressure of said spring, whereby the pressure of the spring applied to the platen produces a frictional holding pressure between said platen and its bearings so that the platen is prevented from rotating too freely while disconnected from the line-space wheel.

21. The combination with a platen frame and a platen having an axle journaled in the frame, of a line-space wheel mounted on the axle for rotation relative to the platen, a friction clutch disk fixed to the axle, said wheel movable longitudinally of the axle into and out of frictional holding engagement with the disk, a sleeve mounted on the axle, a clutch spring reacting between said sleeve and a part fixed to the axle, to move the sleeve longitudinally of the axle and cause it to hold the said sleeve against said disk, means to move said sleeve in opposition to the spring to free the line-space wheel and cause the spring to react between the platen frame and the platen, whereby the latter is frictionally held with an endwise pressure against the platen frame, to prevent the platen from rotating too freely while disconnected from the line-space wheel.

ADOLPHUS S. DENNIS.

Witnesses:
 Titus H. Irons,
 F. E. Alexander.